(12) United States Patent
Cook

(10) Patent No.: US 7,010,778 B2
(45) Date of Patent: Mar. 7, 2006

(54) METHOD, APPARATUS, AND PROGRAM FOR A STATE MACHINE FRAMEWORK

(75) Inventor: John A. Cook, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 591 days.

(21) Appl. No.: 10/179,329

(22) Filed: Jun. 24, 2002

(65) Prior Publication Data

US 2003/0237027 A1 Dec. 25, 2003

(51) Int. Cl.
*G06F 9/44* (2006.01)

(52) U.S. Cl. .................. 717/106; 717/108; 717/117; 719/318

(58) Field of Classification Search ........ 717/106–108, 717/175, 146, 140, 117; 719/318; 370/352, 370/401, 463; 709/318; 713/323; 707/200, 707/103 R; 700/86; 715/315, 316
See application file for complete search history.

(56) References Cited

U.S. PATENT DOCUMENTS

| | | | | |
|---|---|---|---|---|
| 5,469,553 A | * | 11/1995 | Patrick ..................... | 713/323 |
| 5,504,896 A | * | 4/1996 | Schell et al. ............... | 725/131 |
| 5,717,692 A | * | 2/1998 | Blackwell .................. | 370/463 |
| 5,995,753 A | * | 11/1999 | Walker ...................... | 717/108 |
| 6,138,171 A | * | 10/2000 | Walker ...................... | 719/318 |
| 6,157,648 A | * | 12/2000 | Voit et al. .................. | 370/401 |
| 6,405,210 B1 | * | 6/2002 | Doyle et al. ............ | 707/103 R |
| 6,442,441 B1 | * | 8/2002 | Walacavage et al. ......... | 700/86 |
| 6,748,588 B1 | * | 6/2004 | Fraser et al. ................ | 717/146 |
| 6,839,340 B1 | * | 1/2005 | Voit et al. .................. | 370/352 |
| 2002/0032692 A1 | * | 3/2002 | Suzuki et al. ............... | 707/200 |
| 2002/0120921 A1 | * | 8/2002 | Coburn et al. .............. | 717/140 |
| 2002/0144015 A1 | * | 10/2002 | Lortz ......................... | 709/318 |
| 2003/0046658 A1 | * | 3/2003 | Raghavan et al. .......... | 717/106 |
| 2003/0159138 A1 | * | 8/2003 | Curtis ........................ | 717/175 |
| 2004/0010776 A1 | * | 1/2004 | Shah .......................... | 717/117 |
| 2004/0172613 A1 | * | 9/2004 | Gallagher ................... | 717/108 |
| 2004/0172614 A1 | * | 9/2004 | Gallagher ................... | 717/108 |
| 2004/0255303 A1 | * | 12/2004 | Hogan et al. ............... | 719/318 |

OTHER PUBLICATIONS

Chung-Shyan et al., An FSM-based program generator for communication protocol software, IEEE, Nov. 9-11, 1994 pp.:181-187.*

(Continued)

*Primary Examiner*—Wei Y. Zhen
*Assistant Examiner*—Satish S. Rampuria
(74) *Attorney, Agent, or Firm*—Duke W. Yee; Jeffrey S. LaBaw; Wayne P. Bailey

(57) ABSTRACT

A programming framework is provided for designing and implementing software state machines. A state machine initializer may be created that defines the states, conditions, actions, triggers, and state transitions for the software state machines. A set of user interfaces, may also be provided for creating initializers. An abstract state machine object may then be created that creates an instance of a particular state machine initializer. The state machine initializer acts as a helper to the state machine object, which uses the initializer to create an array of state transition objects. A set of programming interfaces may also be provided to define the programming framework. Events generated by one state machine may be used as triggers by another state machine. Furthermore, state values of one state machine may be used as inputs by other state machines. State machines may also share triggers and inputs.

21 Claims, 13 Drawing Sheets

OTHER PUBLICATIONS

Thomas et al., State machines, IEEE, vol. 19, Issue 6, Nov.-Dec. 2002 pp.:10-12.*

Burkhart et al., Software reuse and portability of parallel programs, IEEE, vol. 2, Jan. 3-6, 1995 pp.:289-298.*

Forcer et al., An integrated framework for digital electronics education—programmable logic and IC design tools, IEEE, vol. 2, Jan. 3-4, 2002 pp.: 37/1-37/6.*

Gao et al., Object state testing for object-oriented programs, IEEE, Aug. 9-11, 1995 pp.:232-238.*

AUS920010995US1, Cook, Method, Apparatus, and Program for a State Machine Framework, Jan. 17, 2002.

* cited by examiner

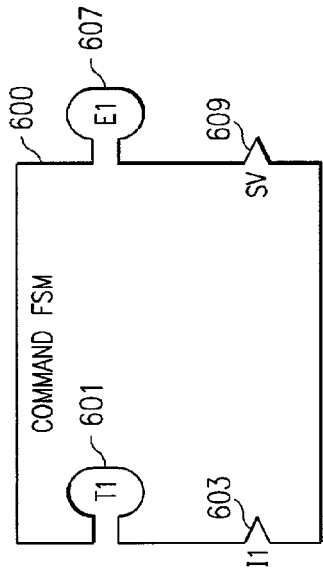

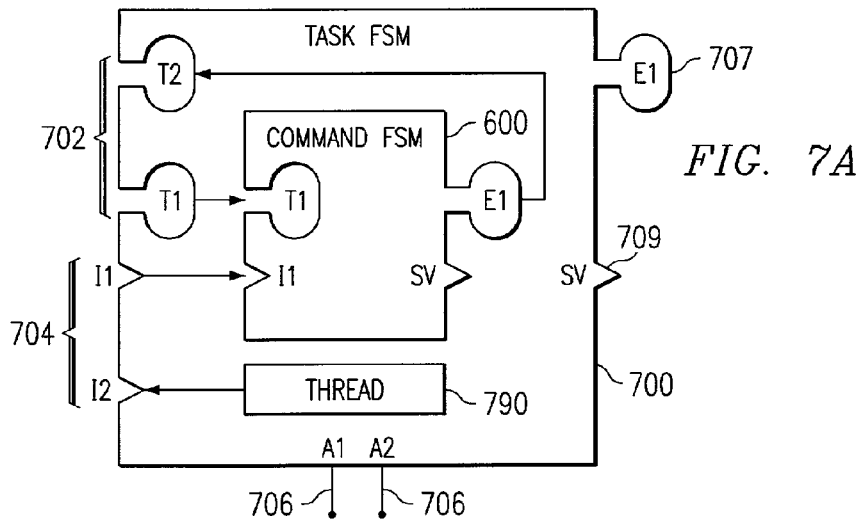

| STATES | |
|---|---|
| ID | DESCRIPTION |
| 1 | NEW |
| 2 | STARTING |
| 3 | RUNNING |
| 4 | STOPPING |
| 5 | STOPPED |
| 6 | ERROR |

| ACTIONS | |
|---|---|
| ID | DESCRIPTION |
| A1 | START THREAD |
| A2 | STOP THREAD |

| TRIGGERS | |
|---|---|
| ID | DESCRIPTION |
| T1 | SET NEW COMMAND VALUE |
| T2 | COMMAND FSM STATE CHANGED EVENT |

| INPUTS | |
|---|---|
| ID | DESCRIPTION |
| 1 | THE DESIRED COMMAND STATE |
| 2 | THE STATUS OF THE EMBEDDED THREAD |

| CONDITIONS | |
|---|---|
| ID | DESCRIPTION |
| C1 | (I1==2) AND (I2 IS "THREAD NOT STARTED") |
| C2 | (I1==1) AND (I2 IS "NO THREAD") |
| C3 | (I1==1) AND (I2 IS "THREAD RUNNING") |
| C4 | (I1==2) AND (I2 IS "THREAD RUNNING") |
| C5 | I2 IS "THREAD STOPPED" |
| C6 | I2 IS "THREAD ERROR" |

| EVENTS | |
|---|---|
| ID | DESCRIPTION |
| E1 | STATE CHANGED EVENT |

*FIG. 7C*  STATE TABLE  770

| CURRENT STATE/NEXT STATE | 1 (NEW) | 2 (STARTING) | 3 (RUNNING) | 4 (STOPPING) | 5 (STOPPED) | 6 (ERROR) |
|---|---|---|---|---|---|---|
| 1 (NEW) | N | C2, A1, E1 | C3, --, E1 | X | C1, --, E1 | X |
| 2 (STARTING) | X | N | C3, --, E1 | C4, A2, E1 | C5, --, E1 | C6, A2, E1 |
| 3 (RUNNING) | X | X | N | C4, A2, E1 | C5, --, E1 | C6, A2, E1 |
| 4 (STOPPING) | X | X | X | N | C5, --, E1 | C6, --, E1 |
| 5 (STOPPING) | X | X | X | X | N | X |
| 6 (ERROR) | X | X | X | X | X | N |

775 STATE GRAPH

FIG. 8B

| STATES ||
|---|---|
| ID | DESCRIPTION |
| 1 | NEW |
| 2 | STARTING |
| 3 | RUNNING |
| 4 | STOPPING |
| 5 | STOPPED |
| 6 | ERROR |
| 7 | PAUSED |

810

| ACTIONS ||
|---|---|
| ID | DESCRIPTION |
| A1 | START TASK |
| A2 | STOP TASK |
| A3 | PAUSE TRACE |
| A4 | RESUME TRACE |

820

| TRIGGERS ||
|---|---|
| ID | DESCRIPTION |
| T1 | LATCH A NEW COMMAND ON I1 |
| T2 | STATE CHANGED EVENT FROM COMMAND FSM |
| T3 | STATE CHANGED EVENT FROM TASK FSM |

840

| INPUTS ||
|---|---|
| ID | DESCRIPTION |
| I1 | THE DESIRED COMMAND |
| I2 | THE SV OF THE EMBEDDED COMMAND FSM |
| I3 | THE SV OF THE EMBEDDED TASK FSM |

830

| EVENTS ||
|---|---|
| ID | DESCRIPTION |
| E1 | STATE CHANGED EVENT |

850

| CONDITIONS ||
|---|---|
| ID | DESCRIPTION |
| C1 | I1=="START" |
| C2 | I1=="STOP" |
| C3 | I1=="PAUSE" |
| C4 | I1=="RESUME" |
| C5 | I2=="STARTING" |
| C6 | I2=="RUNNING" |
| C7 | I2=="STOPPING" |
| C8 | I2=="STOPPED" |
| C9 | I2=="ERROR" |

860

FIG. 8C STATE TABLE 870

| CURRENT STATE/NEXT STATE | 1 (NEW) | 2 (STARTING) | 3 (RUNNING) | 4 (STOPPING) | 5 (STOPPED) | 6 (ERROR) | 7 (PAUSED) |
|---|---|---|---|---|---|---|---|
| 1 (NEW) | N | C1, A1, E1 | X | X | C2, A2, E1 | C9, --, E1 | X |
| 2 (STARTING) | X | N | C6, --, E1 | C1, A2, E1 | X | C9, --, E1 | X |
| 3 (RUNNING) | X | X | C4, A3, E1<br>C1, --, -- | C2, A2, E1 | X | C9, --, E1 | C3, A3, E1 |
| 4 (STOPPING) | X | X | X | N | C8, --, E1 | C9, --, E1 | X |
| 5 (STOPPED) | X | X | X | X | N | X | X |
| 6 (ERROR) | X | X | X | X | X | N | X |
| 7 (PAUSED) | X | X | C4, A4, E1 | C2, A2, E1 | X | C9, --, E1 | C4, --, -- |

875 STATE GRAPH

METHOD, APPARATUS, AND PROGRAM FOR A STATE MACHINE FRAMEWORK

RELATED APPLICATIONS

The present application is related to commonly assigned and co-pending U.S. patent application Ser. No. 10/047,801 entitled "METHOD, APPARATUS, AND PROGRAM FOR A STATE MACHINE FRAMEWORK", filed on Jan. 17, 2002, and hereby incorporated by reference.

BACKGROUND OF THE INVENTION

1. Technical Field

The present invention relates to data processing and, in particular, to software state machines. Still more particularly, the present invention provides a method, apparatus, and program for a programming framework for creating, using, and re-using software state machines.

2. Description of Related Art

State machines, also referred to as "finite state machines," are computing devices designed with the operational states required to solve a specific problem. The circuits are minimized and specialized for the application. There are countless special-purpose devices built as state machines.

A hardware state machine typically receives one or more inputs, determines from those inputs whether the current state changes, and takes an action when a state transition occurs. For example, an elevator may be in a state of "stopped" and recognize that a floor button is pressed. In response, the elevator state machine may then transition to a "moving" state.

With reference to FIG. 1, a block diagram of a typical hardware state machine is shown. The hardware state machine receives inputs through inputs latch 102. The state calculator 110 determines the current state based on the inputs. The state machine may provide the current state 112. The state machine may also provide outputs through output latch 114 or take an action through control circuits 116. Therefore, in the above example, if the elevator state machine transitions from "stopped" to "moving," the state machine may activate a control circuit to close the elevator doors.

State transitions in a hardware state machine are typically synchronized with a clock, such as clock 120 in FIG. 1. The state calculator may simply look up the current state and the inputs in a table. Thus, state calculator 110 may simply be a lookup table in a memory.

Software may also operate as a state machine. For example, a software media player may be in a "stopped," "paused," or "playing" state. The software media player, in this example, may monitor graphical buttons on a media player interface and change state in response to activation of those buttons.

With reference now to FIG. 2, a block diagram of a typical software state machine is shown. The software equivalent of latching inputs is to collect them by a means such as reading them into input variables. The software inputs are shown as conditions 202. The state calculator 210 determines whether to make a state change based on the current state and the conditions. The state calculator may comprise a sequence of conditional statements, such as "if-then" statements, or it may use other means such as a switch statement or a dispatching table.

The software equivalent of control circuits is the invocation of actions 216, which may be software instructions, programs, methods, etc. The software equivalent of synchronizing to a clock may be to monitor events that have been collected into an event FIFO (first-in, first-out). Thus, a software state machine may include event triggers 220 that "listen to" events and record them into FIFO 222. Typically, the event triggers simply monitor for a change in conditions 202.

The design of software state machines may be simple for some applications. The designer may simply create a table of states, actions and conditions. The programmer must then create software instructions for each potential state transition. This is no easy task, particularly for more complicated applications. Also, once a software state machine is created, it may be difficult to make changes. For example, if there is an error in one of the state transitions, it would be very difficult to locate and modify the instructions that pertain to that particular state transition in the code.

Furthermore, once software state machines are created, it is difficult for one software state machine to interact with another software state machine. Each state machine may be programmed in a different language using different conventions. Thus, it may be impossible, or at least very difficult, to receive the state of a software state machine once it is coded. It is important to be able to reuse state machines in the designs of new state machines. Unless the design of the state machine provides a means that the outputs of one state machine can be used as the inputs to other state machines, and unless that means follows good component-oriented and object-oriented principles, combining the state machines can be very difficult.

Therefore, it would be advantageous to provide an improved programming framework for creating, using, and combining software state machines.

SUMMARY OF THE INVENTION

The present invention provides a programming framework for designing and implementing software state machines. When designing state machines, a state machine initializer may be created that defines the states, conditions, actions, triggers, and state transitions for the software state machines. A set of user interfaces, such as graphical user interfaces, may also be provided for creating initializers.

An abstract state machine object may then be created that creates an instance of a state machine which loads its design information from a particular state machine initializer. The state machine initializer acts as a helper to the state machine object, which uses the initializer to create an array of state transition objects. Once the state machine objects creates the array of state transition objects, the state machine is ready to run. A set of programming interfaces may also be provided to define the programming framework.

Events generated by one state machine may be used as triggers by another state machine. Furthermore, state values of one state machine may be used as inputs by another state machines. State machines may also share triggers and inputs. The programming interfaces allow state machines to be seamlessly combined and embedded without having to know the details of how the state machines are programmed.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIGS. 6A–6C illustrate an example command state machine in accordance with a preferred embodiment of the present invention;

FIGS. 7A–7D illustrate an example task state machine in accordance with a preferred embodiment of the present invention;

FIGS. 8A–8D illustrate an example trace task state machine in accordance with a preferred embodiment of the present invention;

DETAILED DESCRIPTION OF THE PREFERRED EMBODIMENT

Figure 1:
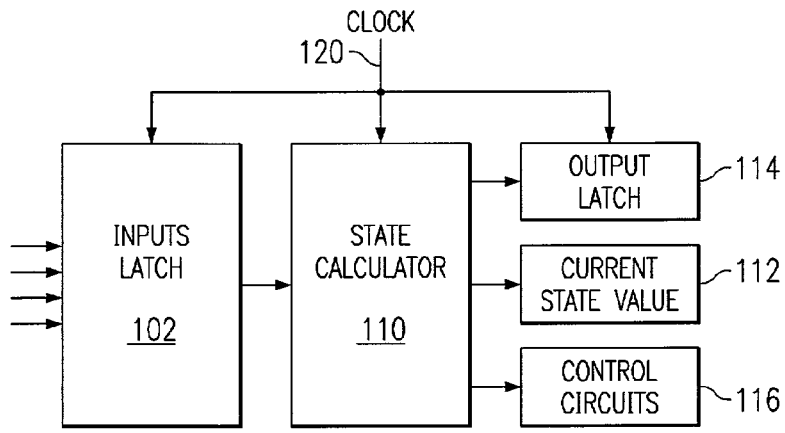
FIG. 1 is a block diagram of a typical hardware state machine.
Figure 2:
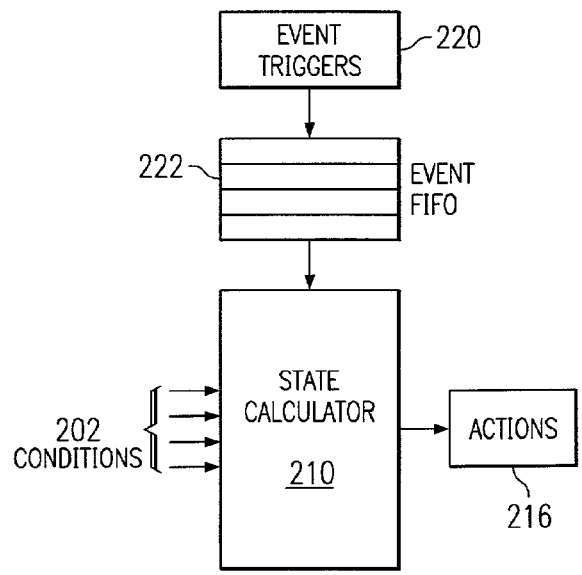
FIG. 2 is a block diagram of a typical software state machine.
Figure 3:
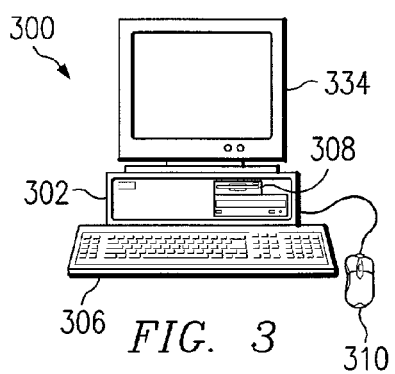
FIG. 3 is a pictorial representation of a data processing system in which the present invention may be implemented in accordance with a preferred embodiment of the present invention.

With reference now to the figures and in particular with reference to FIG. 3, a pictorial representation of a data processing system in which the present invention may be implemented is depicted in accordance with a preferred embodiment of the present invention. A computer 300 is depicted which includes system unit 302, video display terminal 304, keyboard 306, storage devices 308, which may include floppy drives and other types of permanent and removable storage media, and mouse 310. Additional input devices may be included with personal computer 300, such as, for example, a joystick, touchpad, touch screen, trackball, microphone, and the like. Computer 300 can be implemented using any suitable computer, such as an IBM RS/6000 computer or IntelliStation computer, which are products of International Business Machines Corporation, located in Armonk, N.Y.

Although the depicted representation shows a computer, other embodiments of the present invention may be implemented in other types of data processing systems, such as a network computer. Computer 300 also preferably includes a graphical user interface (GUI) that may be implemented by means of systems software residing in computer readable media in operation within computer 300.

Figure 4:
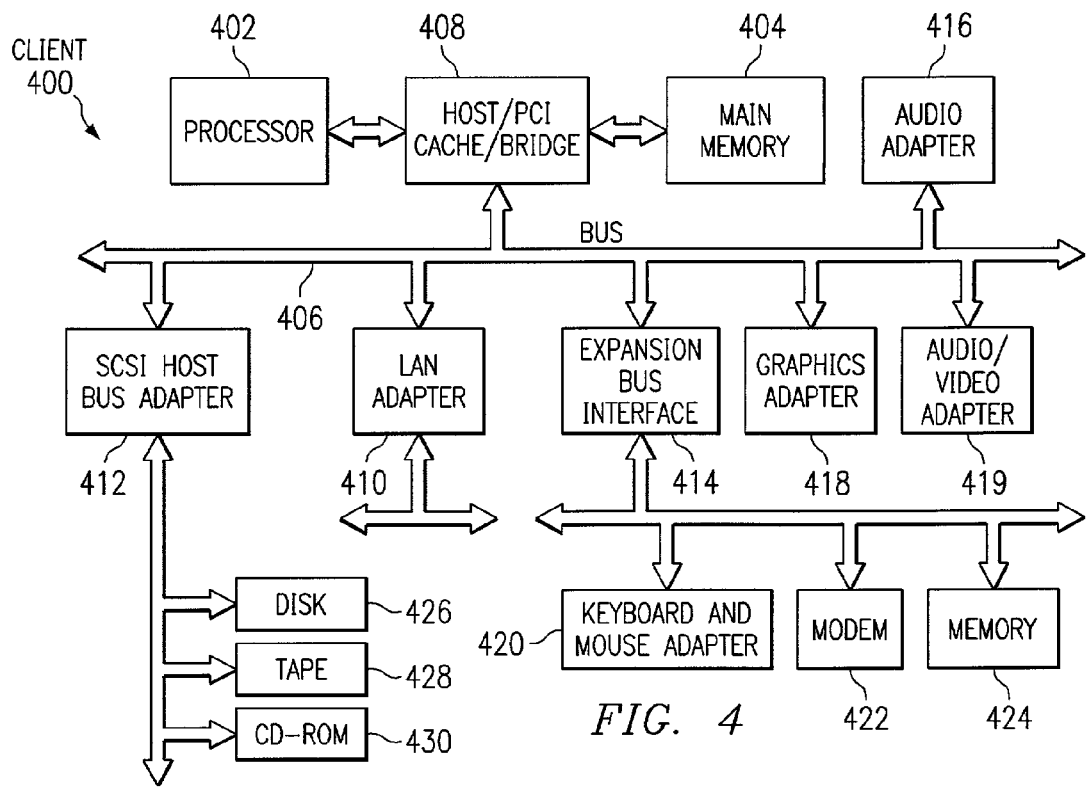
FIG. 4 is a block diagram of a data processing system in which the present invention may be implemented.

With reference now to FIG. 4, a block diagram of a data processing system is shown in which the present invention may be implemented. Data processing system 400 is an example of a computer, such as computer 300 in FIG. 3, in which code or instructions implementing the processes of the present invention may be located. Data processing system 400 employs a peripheral component interconnect (PCI) local bus architecture. Although the depicted example employs a PCI bus, other bus architectures such as Accelerated Graphics Port (AGP) and Industry Standard Architecture (ISA) may be used. Processor 402 and main memory 404 are connected to PCI local bus 406 through PCI bridge 408. PCI bridge 408 also may include an integrated memory controller and cache memory for processor 402. Additional connections to PCI local bus 406 may be made through direct component interconnection or through add-in boards.

In the depicted example, local area network (LAN) adapter 410, small computer system interface SCSI host bus adapter 412, and expansion bus interface 414 are connected to PCI local bus 406 by direct component connection. In contrast, audio adapter 416, graphics adapter 418, and audio/video adapter 419 are connected to PCI local bus 406 by add-in boards inserted into expansion slots. Expansion bus interface 414 provides a connection for a keyboard and mouse adapter 420, modem 422, and additional memory 424. SCSI host bus adapter 412 provides a connection for hard disk drive 426, tape drive 428, and CD-ROM drive 430. Typical PCI local bus implementations will support three or four PCI expansion slots or add-in connectors.

An operating system runs on processor 402 and is used to coordinate and provide control of various components within data processing system 400 in FIG. 4. The operating system may be a commercially available operating system such as Windows 2000, which is available from Microsoft Corporation. An object oriented programming system such as Java may run in conjunction with the operating system and provides calls to the operating system from Java programs or applications executing on data processing system 400. "Java" is a trademark of Sun Microsystems, Inc. Instructions for the operating system, the object-oriented programming system, and applications or programs are located on storage devices, such as hard disk drive 426, and may be loaded into main memory 404 for execution by processor 402.

Those of ordinary skill in the art will appreciate that the hardware in FIG. 4 may vary depending on the implementation. Other internal hardware or peripheral devices, such as flash ROM (or equivalent nonvolatile memory) or optical disk drives and the like, may be used in addition to or in place of the hardware depicted in FIG. 4. Also, the processes of the present invention may be applied to a multiprocessor data processing system.

For example, data processing system 400, if optionally configured as a network computer, may not include SCSI host bus adapter 412, hard disk drive 426, tape drive 428, and CD-ROM 430. In that case, the computer, to be properly called a client computer, includes some type of network communication interface, such as LAN adapter 410, modem 422, or the like. As another example, data processing system 400 may be a stand-alone system configured to be bootable without relying on some type of network communication interface, whether or not data processing system 400 comprises some type of network communication interface. As a further example, data processing system 400 may be a personal digital assistant (PDA), which is configured with ROM and/or flash ROM to provide non-volatile memory for storing operating system files and/or user-generated data.

The depicted example in FIG. 4 and above-described examples are not meant to imply architectural limitations. For example, data processing system 400 also may be a notebook computer or hand held computer in addition to taking the form of a PDA. Data processing system 400 also may be a kiosk or a Web appliance.

The processes of the present invention are performed by processor 402 using computer implemented instructions, which may be located in a memory such as, for example, main memory 404, memory 424, or in one or more peripheral devices 426–430.

Figure 5:
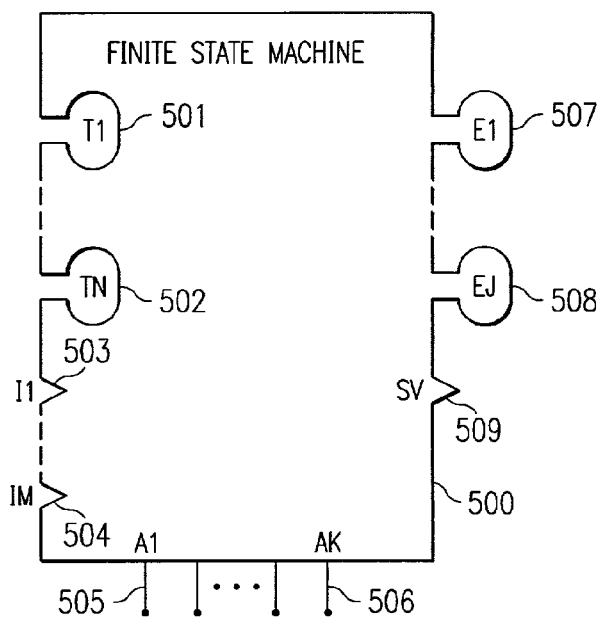
FIG. 5 is a graphical representation of a finite state machine in accordance with a preferred embodiment of the present invention.

With reference to FIG. 5, a graphical representation of a finite state machine is shown in accordance with a preferred embodiment of the present invention. Finite state machine (FSM) 500 changes state in response to triggers $T_1$ 501 to $T_N$ 502. The FSM receives as inputs $I_1$ 503 to $I_M$ 504, takes actions $A_1$ 505 to $A_K$ 506, and generates events $E_1$ 507 to $E_J$ 508. N, M, K, and J are all non-negative integers. Therefore, for example, FSM 500 may respond to zero or more triggers, receive zero or more inputs, take zero or more actions, and generate zero or more events. FSM 500 also has a state value (SV) 509. The state value may be used as an input to another FSM.

With reference now to FIG. 6A, a graphical representation of an example command FSM is shown in accordance with a preferred embodiment of the present invention. Command FSM 600 changes states in response to trigger T1 601, receives input I1 603, generates event E1 607, and has state value SV 609.

Turning to FIG. 6B, a set of tables holding the design information for command FSM 600 is illustrated in accordance with a preferred embodiment of the present invention. States table 610 defines the states that the command FSM may take. As seen in states table 610, the command FSM may take states of "No-op," "Start," and "Stop." The states are associated with identifiers 0–2, respectively.

Command FSM 600 takes no actions; therefore, actions table 620 is empty. Next, inputs observed table 630 defines the inputs that affect state transitions. The table includes one input, "The Desired Next State" associated with the identifier "I1," that receives a desired next state. This input corresponds to the state variable and may take the values 0–2, as described with respect to states table 610.

Triggers table 640 includes one trigger, labeled T1. Triggers are the events which are received by the state machine. When the trigger occurs, the state machine evaluates its inputs, computes its conditions, and determines the next state and any corresponding actions and event outputs.

Event outputs table 650 includes one output, labeled E1. This output is the "State Changed Event" which is sent to other objects when the trace task state machine changes state.

Conditions table 660 shows the logical conditions that are examined by different entries in the state transition table 670. The logical conditions may be Boolean in value (true or false). They are formed from the examination of the values of some or all of the inputs 630 of the state machine. For example, the condition identified as C0 is true when I1==0 is true: the desired next state is No-op.

With reference now to FIG. 6C, state transitions table 670 defines state transitions, conditions that that cause the state transitions, actions that are taken in response to state transitions, and events that are generated when the state transitions complete. In each cell of the state transitions table, there are entries for all three design components: condition, action, and event. For example, the trace task FSM may transition from a "No-op" state (0) to a "Start" state (1) only when condition C0 is true. When the command FSM transitions from "No-op" to "Start," no event is generated.

As another example in the state transitions table, the command FSM may transition from a "Start" state (1) to a "Stop" state (2) only when condition C2 is true. The condition C2 corresponds to receiving "Stop" as the desired next state (I1=2). The command FSM would then generate a state changed event E1. Note also that for the implementation described in state table 670, the notation "--" means that no action or event is defined.

With reference now to FIG. 7A, a graphical representation of an example task FSM is shown in accordance with a preferred embodiment of the present invention. Task FSM 700 changes states in response to triggers T1 and T2 702, receives inputs I1 and I2 704, takes actions A1 and A2 706, generates event E1 707, and has state value SV 709.

Task FSM 700 interacts with command FSM 600. For example, the task FSM receives trigger T1, which is the same as trigger T1 in command FSM 600. The task FSM also receives as trigger T2 the event E1 from the command FSM. In addition, the task FSM receives input I1, which is the same as input I1 in the command FSM. Task FSM also receives as input I2 the state of thread 790 that is embedded in the task FSM.

The interaction of task FSM 700 with the command FSM 600 can be implemented in several ways. The two FSMs can be implemented as separate software objects that are associated with each other at runtime or at compile time. The interactions between the two will take place by method calls from one to the other. The association between the two can take place at object construction or later by setting properties of the object.

A second implementation may have task FSM 700 contain an embedded command FSM 600. From a programming point of view, the contained command FSM 600 is invisible to other objects in the system. This approach allows the task FSM to appear as a simple object for future reuse or embedding in subsequent designs. Interactions between the two FSMs may still take place by method calls form one to the other, but no third party object would be able to call a method directly to the embedded FSM object.

A third implementation approach would make command FSM 600 a superclass of task FSM 700. Task FSM 700 would then provide an implementation that uses the base class functions of command FSM 600 and yet also provides its own specializations.

There are be general design guidelines to help choose the best approach. For example, subclassing approaches work best when the two FSMs are similar. For example, in FIG. 7A, both use the same trigger T1 702, both produce the same event E1 707, and both use the same input I1 704. On the other hand, if the triggers or events are very different, embedding may be a better approach. If access to the state variable of the helper FSMs is required, an implementation as separate objects might be appropriate. There are many other reasons and analyses to help choose the implementation. The approaches offered here are examples to highlight possible implementations that may embody the invention.

Turning now to FIG. 7B, a set of tables holding the design information for task FSM 700 is illustrated in accordance with a preferred embodiment of the present invention. States table 710 defines the states that the task state machine may take. As seen in states table 710, the task FSM may take states of "New," "Starting," "Running," "Stopping," "Stopped," and "error." The states are associated with identifiers 1–6, respectively.

Actions table 720 defines the actions that the task FSM may take. As seen in table 720, there are two actions, labeled "Start Thread" and "Stop Thread." These actions are associated with identifiers A1 and A2, respectively.

Next, inputs observed table 730 defines the inputs that affect state transitions. The first input (I1) is "The Desired Command State" that corresponds to input I1 in command FSM 600.

The second input (I2) is "The Status of the Embedded Thread" that may be obtained from thread 790. This input may take the values of, for example, "Thread Not Started," "No Thread," "Thread Running," "Thread Stopped," and "Thread Error."

Triggers table 740 includes two triggers. There are two triggers, labeled T1 and T2. When either trigger occurs, the state machine evaluates its inputs, computes its conditions, and determines the next state and any corresponding actions and event outputs. Trigger T1 is "Set New Command Value." Trigger T2 is "Command FSM State Changed Event," which is received form E1 of command FSM 600.

Event outputs table 750 includes one output. This output is the "State Changed Event" which is sent to other objects when the task state machine changes state.

Conditions table 760 shows the logical conditions that are examined by different entries in the state table 770. The logical conditions may be Boolean in value (true or false). They are formed from the examination of the values of some or all of the inputs 730 of the state machine. For example, the condition identified as C1 is true when two conditions are true: the value of the input identified as I1 has the value 2 ("Stop"), and the value of the input identified as I2 has the value "Thread Not Started". As another example, the conditions identified as C5 and C6 depend only on the value of one of the inputs, identified as I2.

With reference now to FIG. 7C, state transitions table 770 defines state transitions, conditions that that cause the state transitions, actions that are taken in response to state transitions, and events that are generated when the state transitions complete. In each cell of the state transitions table, there are entries for all three design components: condition, action, and event. For example, the task FSM may transition from a "New" state (1) to a "Starting" state (2) only when condition C2 is true. When the task FSM transitions from "New" to "Starting," action A1 is taken, and event E1 is generated.

As another example in the state transitions table, the task FSM may transition from a "Running" state (3) to a "Stopped" state (5) only when condition C5 is true. The condition C5 corresponds to thread 790 being stopped. The task FSM would not perform an action and it would generate a state changed event E1.

Some cells in the state table 770 have the value 'X'. This notation means that there is no legal transition defined for that cell. For example, if the trace task FSM is in the "New" state (1), it cannot dispatch directly to the "Stopping" state (4). Some cells have the value 'N'. This notation means that no state change takes place. Thus, if no conditions are satisfied when a trigger takes place, the state machine will not change state. Otherwise, the state machine could produce an error.

Figure 7D:
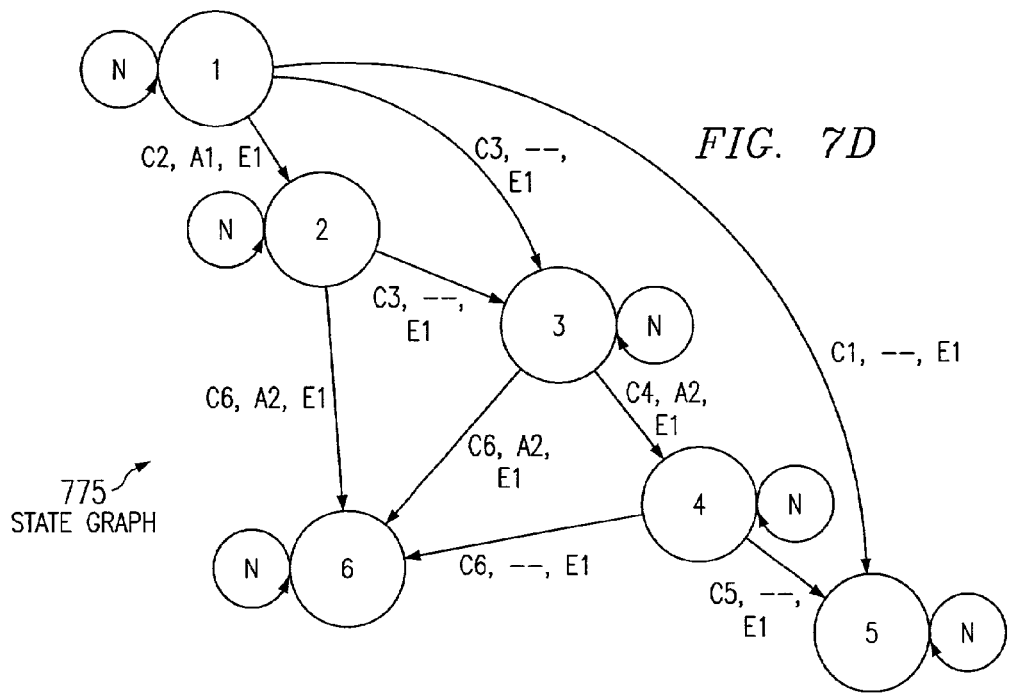

With reference now to FIG. 7D, it is well known in the art of state machines that an alternative representation to a state transition table is a graph of state transitions. FIG. 7D provides state graph 775. The state graph represents all of the transitions defined in the state table 770. The absence of an edge in the graph between two nodes is equivalent to the notation of an "X" in the state table. For example, in state graph 775, there is not an edge that directly connects state 1 with state 4. With either representation, the presentation of conditions, actions, and events fully defines the design information for the dynamic behavior of the state machine.

Figure 8A:
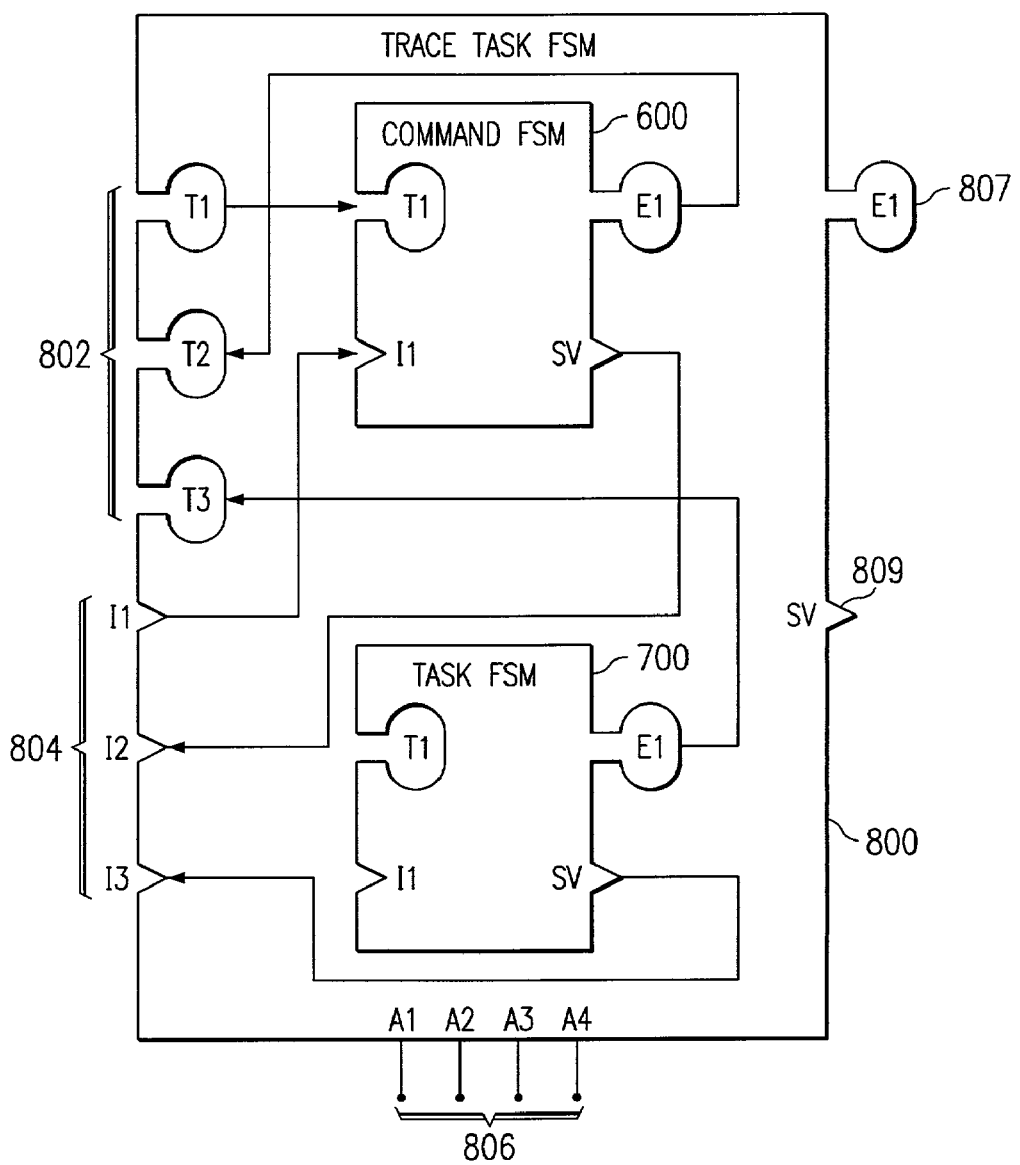

With reference now to FIG. 8A, a graphical representation of an example trace task FSM is shown in accordance with a preferred embodiment of the present invention. Trace task FSM 800 changes states in response to triggers T1–T3 802, receives inputs I1–I3 804, takes actions A1–A4 806, generates event E1 807, and has state value SV 809.

Trace task FSM 800 interacts with command FSM 600 and task FSM 700. For example, the trace task FSM receives trigger T1, which is the same as trigger T1 in command FSM 600. The trace task FSM also receives as trigger T2 the event E1 from the command FSM and receives as trigger T3 the event E1 from the task FSM. In addition, trace task FSM 800 receives input I1, which is the same as input I1 in the command FSM. Task FSM also receives as input I2 the state value of command FSM 600 and receives as input I3 the state value of task FSM 700.

In more complex designs, it is possible to construct hybrid implementations that combine the techniques shown above. For example, trace task FSM 800 may be implemented as a subclass of task FSM 700, but it may contain a distinct, embedded object of command FSM 600. From the point of view of the invention, the triggers, inputs, events, actions, and state variables of trace task FSM 800 remain the same no matter which implementation the designer chooses. Trace task FSM 800 is equally available for use as a building block of another, more complex FSM using any similar implementation technique.

With reference now to FIG. 8B, a set of tables holding the design information for an example trace task state machine is illustrated in accordance with a preferred embodiment of the present invention. States table 810 defines the states that the trace task state machine may take. As seen in states table 810, the trace task FSM may take states of "New," "Starting," "Running," "Stopping," "Stopped," "Error," and "paused." The states are associated with identifiers 1–7, respectively.

Actions table 820 defines the actions that the trace task FSM may take. Actions are operations that are performed internally or to some external mechanism. As seen in table 820, there are four actions, labeled "Start Task", "Stop Task", "Pause Trace", and "Resume Trace." These actions are associated with identifiers A1–A4, respectively.

Next, inputs observed table 830 defines the inputs that affect state transitions. The first input (I1) is "The Desired Command" which corresponds to I1 of command FSM 600. The second input (I2) is "The SV of the Embedded Command FSM" that gets the state of command FSM 600. The third input (I3) is "The SV of the Embedded Task FSM" that gets the state of task FSM 700.

Triggers table 840 includes three triggers, labeled T1–T3. When any of the trigger occurs, the state machine evaluates its inputs, computes its conditions, and determines the next state and any corresponding actions and event outputs. Thus, trace task FSM 800 determines the next state in response to latching a new command on I1, a State Change Event from the command FSM or a State Change Event from the task FSM.

Event outputs table 850 includes one output. This output is the "State Changed Event" which is sent to other objects when the trace task state machine changes state.

Conditions table 860 shows the logical conditions that are examined by different entries in the state table 870. The logical conditions may be Boolean in value (true or false).

They are formed from the examination of the values of some or all of the inputs 830 of the state machine. For example, the condition identified as C1 is true when the value of the input identified as I1 has the value "Start." As another example, the conditions identified as C5–C9 depend only on the value of I2.

With reference now to FIG. 8C, state transitions table 870 defines state transitions, conditions that that cause the state transitions, actions that are taken in response to state transitions, and events that are generated when the state transitions complete. For example, the trace task FSM may transition from a "New" state (1) to a "Starting" state (2) only when condition C1 is true. When the trace task FSM transitions from "New" to "Starting," action A1 is taken, and event E1 is generated.

As another example in the state transitions table, the trace task FSM may transition from a "Running" state (3) to a "Paused" state (7) only when condition C3 is true. The condition C3 corresponds to receiving the "Pause" state as the desired next state for command FSM 600. The trace task FSM would then perform the action A3 to pause the trace, and it would generate a state changed event E1.

Some cells in the state table 870 have more than one set of conditions, action, and events. For example, if the trace task FSM is in the "Running" state (3), condition C4 or condition C1 may be in place. Note that for either of these conditions, independent actions and independent events may be generated, depending on which condition was evaluated to be true.

Figure 8D:
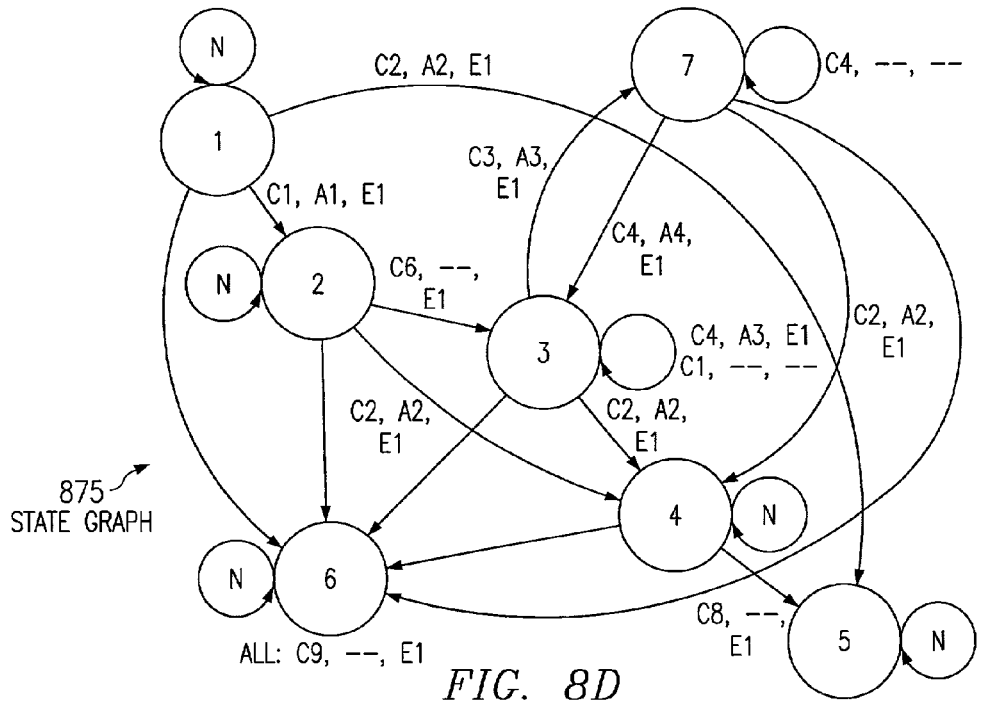

With reference now to FIG. 8D, it is well known in the art of state machines that an alternative representation to a state transition table is a graph of state transitions. FIG. 8D provides state graph 875. The state graph represents all of the transitions defined in the state table 870. The absence of an edge in the graph between two nodes is equivalent to the notation of an "X" in the state table. For example, there is not an edge that directly connects state 1 with state 4. With either representation, the presentation of conditions, actions, and events fully defines the design information for the dynamic behavior of the state machine.

For each valid state transition, the conditions, actions, and events for that state transition are entered into table 870 and into the equivalent graph 875. However, regardless of the application, converting this set of tables into a program that operates as a state machine is no easy task. Furthermore, once a software state machine is created, it may be difficult to make changes and it may be difficult for one software state machine to interact with another software state machine.

In accordance with a preferred embodiment of the present invention, a programming framework for designing and implementing software state machines is provided. A state machine initializer may be created that defines the states, inputs, conditions, actions, triggers, events, and state transitions for the software state machines. A set of user interfaces, such as graphical user interfaces, may also be provided for creating initializers.

Examples of screens of display of state machine initializer windows are shown in FIGS. 9A–9D in accordance with a preferred embodiment of the present invention. Particularly, with respect to FIG. 9A, the screen comprises window 900, including a title bar 902, which may display the name of the application program. Title bar 902 also includes a control box 904, which produces a drop-down menu (not shown) when selected with the mouse, and "minimize" 906, "maximize" or "restore" 908, and "close" 910 buttons. The "minimize" and "maximize" or "restore" buttons 906 and 908 determine the manner in which the program window is displayed. In this example, the "close" button 910 produces an "exit" command when selected. The drop-down menu produced by selecting control box 904 includes commands corresponding to "minimize," "maximize" or "restore," and "close" buttons, as well as "move" and "resize" commands.

State machine initializer window 900 also includes a menu bar 912. Menus to be selected from menu bar 912 may include "File," "Edit," "View," "Insert," "Format," "Tools," "Window," and "Help." However, menu bar 912 may include fewer or more menus, as understood by a person of ordinary skill in the art.

The state machine initializer window display area includes a display area in which entered states 922 are displayed. The states may be edited in this display area. The display area may also include an "add new state" button 924. When this button is selected, a new state dialog may be presented.

Figure 9A:
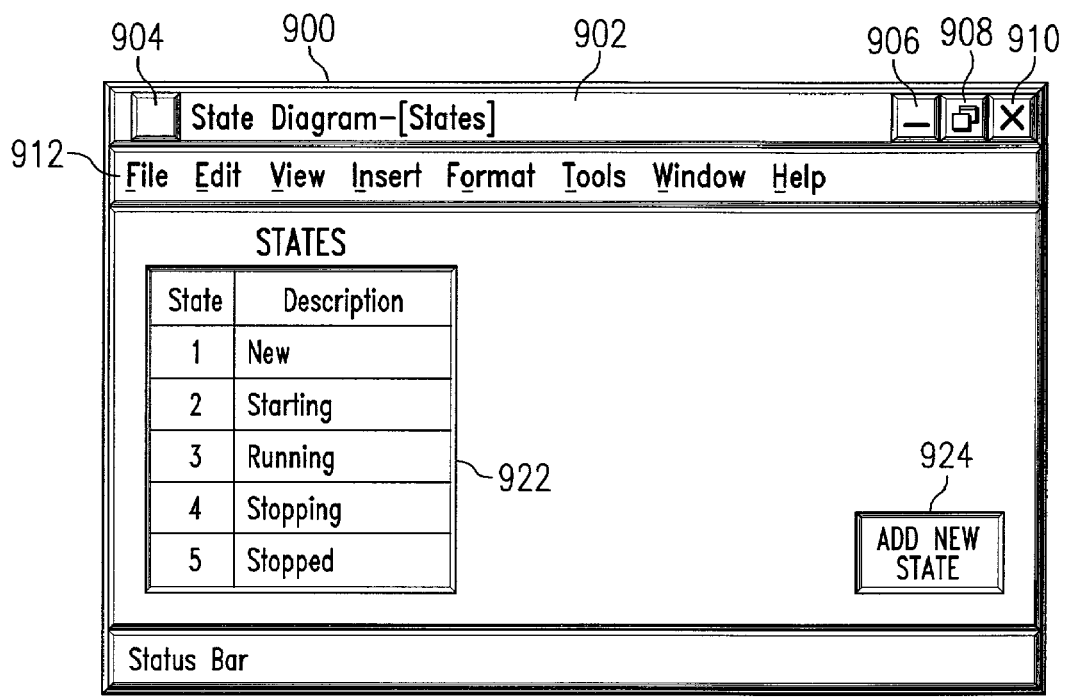
FIGS. 9A–9D are examples of screens of display of state machine initializer windows in accordance with a preferred embodiment of the present invention.
Figure 9B:
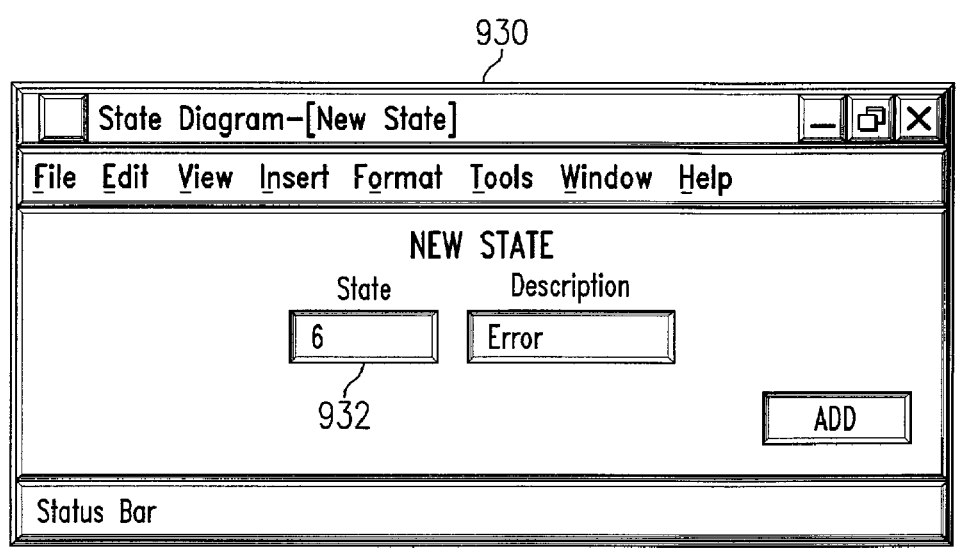

Turning to FIG. 9B, an example of a new state dialog window is shown in accordance with a preferred embodiment of the present invention. New state dialog window 930 includes a display area in which data entry fields 932 are presented for entering the new state information.

FIGS. 9A and 9B show an example of a graphical user interface for entering states for the trace task example shown in FIGS. 8A–8D. However, the illustrated user interface may also be used for other applications. Furthermore, other user interfaces may be used, such as a command line interface. Still further, similar graphical user interfaces may be used for entering actions, inputs observed, triggers, conditions, and events. There may also be graphical interfaces for entering the state table itself or for working with the state table graphically.

Triggers and inputs may be entered using graphical user interfaces similar to those shown in FIGS. 9A and 9B. Furthermore, data entry fields for triggers and inputs may include drop-down windows from which triggers, inputs, events, and state values from other state machines may be selected. For example, the data entry fields for a state machine may allow selection of a common input from a superclass FSM. As another example, the data entry fields for a state machine may allow selection of an event generated by an embedded FSM as a trigger. Also, the graphical user interfaces may further include an interface for selecting embedded or superclass state machines or other separate state machines.

Figure 9C:
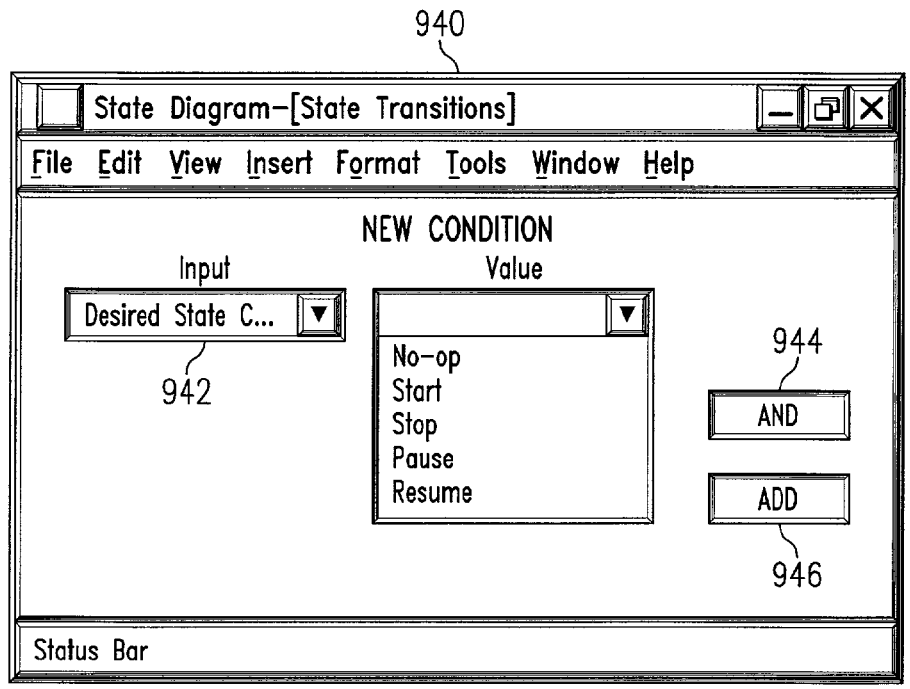

With reference now to FIG. 9C, new condition window 940, including a display area in which a new condition 942 may be entered. Each data entry field may include a drop-down window for entering the information. For example, drop-down window 654 may be used to select a value for the command (C) condition. Values may be presented from data that was previously collected using a graphical user interface similar to that shown in FIGS. 6A and 6B.

More particularly, conditions may be derived from the inputs to the state machine. Boolean expressions may be formed, such as by use of "and" button 944. The display area may also include an "add" button 946. This button may be selected to indicate that the Boolean expression for the new condition is completed and may be added to the existing conditions.

Figure 9D:
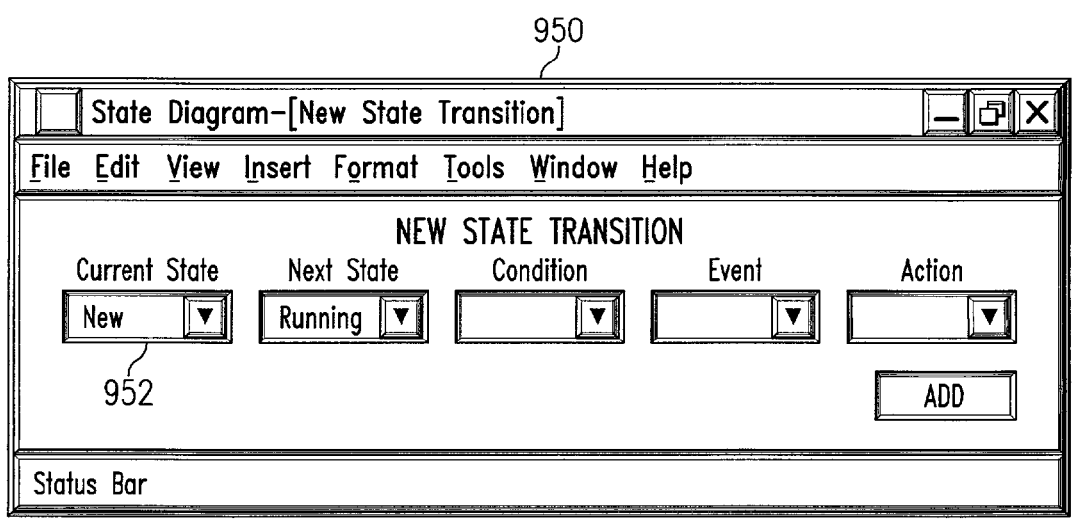

Turning to FIG. 9D, an example of a new state transition dialog window is shown in accordance with a preferred embodiment of the present invention. New state transition dialog window 950 includes a display area in which data entry fields 952 are presented for entering the new state transition information.

Once the data is collected by user interfaces, such as those shown in FIGS. 9A–9D, a specific state machine initializer object may be created. This object may be used by a finite state machine object to build the specific software state machine. Thus, the same FSM object may be used with different initializers to build different state machines. For example, an instance of the FSM object may be used with a command initializer to create a command FSM and an instance of the same FSM object may be used with a task initializer to create a task FSM.

The present invention may be implemented in a Java environment. At the center of a Java runtime environment is the Java virtual machine (JVM), which supports all aspects of Java's environment, including its architecture, security features, mobility across networks, and platform independence.

The JVM is a virtual computer, i.e. a computer that is specified abstractly. The specification defines certain features that every JVM must implement, with some range of design choices that may depend upon the platform on which the JVM is designed to execute. For example, all JVMs must execute Java bytecodes and may use a range of techniques to execute the instructions represented by the bytecodes. A JVM may be implemented completely in software or somewhat in hardware. This flexibility allows different JVMs to be designed for mainframe computers and PDAs.

The JVM is the name of a virtual computer component that actually executes Java programs. Java programs are not run directly by the central processor but instead by the JVM, which is itself a piece of software running on the processor. The JVM allows Java programs to be executed on a different platform as opposed to only the one platform for which the code was compiled. Java programs are compiled for the JVM. In this manner, Java is able to support applications for many types of data processing systems, which may contain a variety of central processing units and operating systems architectures.

Figure 10:
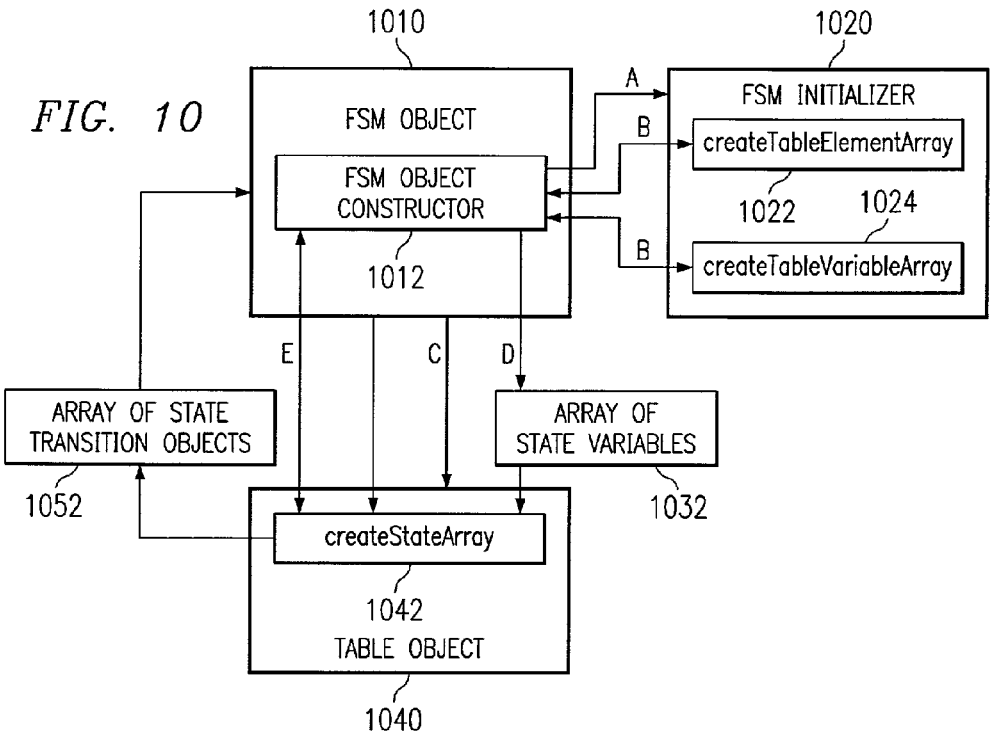
FIG. 10 is a block diagram illustrating the operation of software components to build a state machine in accordance with a preferred embodiment of the present invention.

With reference to FIG. 10, a block diagram illustrating the operation of software components to build a state machine is shown in accordance with a preferred embodiment of the present invention. When a thread or application desiring a FSM is run, FSM object 1010 is created with a reference to an FSM initializer. The FSM object includes FSM object constructor 1012. The FSM object constructor creates an instance of the FSM initializer 1020 (step A).

The FSM initializer is a helper object. The FSM initializer includes methods "createTableElementArray" 1022 and "createTableVariableArray" 1024. FSM object constructor 1012 calls these two methods (step B) and uses the results to create table object 1040 (step C). The table object is also a helper object. The FSM object constructor also looks at the list of input variable names defined in the results from method 1024 and builds array of state variables 1032 which supply those inputs (step D). The instance of the FSM initializer may then be destroyed.

FSM initializer 1020 may include information that allows the FSM to interact with other FSM objects. For example, the FSM initializer may allow the FSM object to embed another FSM object. The FSM initializer may also allow the FSM object receive inputs or triggers from another separate FSM object.

Table object 1040 includes method "createStateArray" 1042 that takes FSM object 1010 and the array of state variables 1032 as inputs. The FSM object constructor calls method 1042 (step E) to create array of state transition objects 1052, which is returned to the FSM object. Thereafter, having received the array of state transition objects, table object 1040 may be destroyed and FSM object 1010 is ready to run.

Figure 11A:
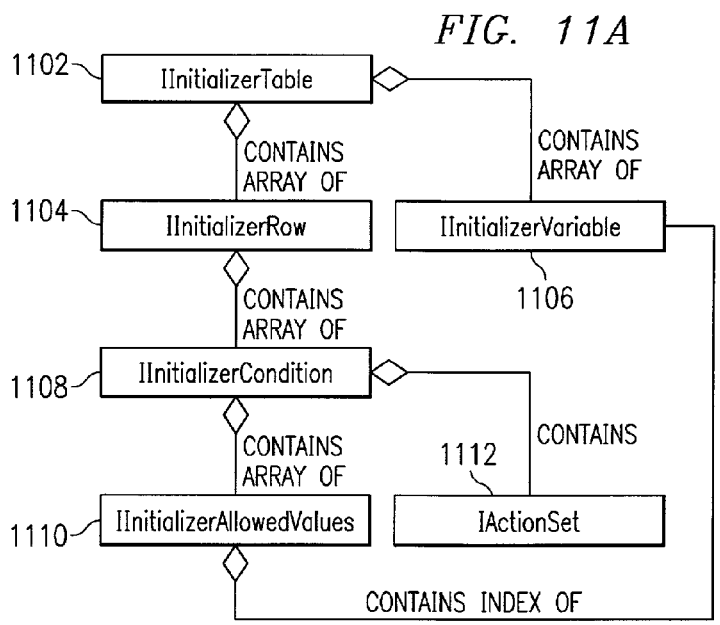
FIGS. 11A and 11B depict a set of interfaces for defining the programming framework in accordance with a preferred embodiment of the present invention.
Figure 11B:
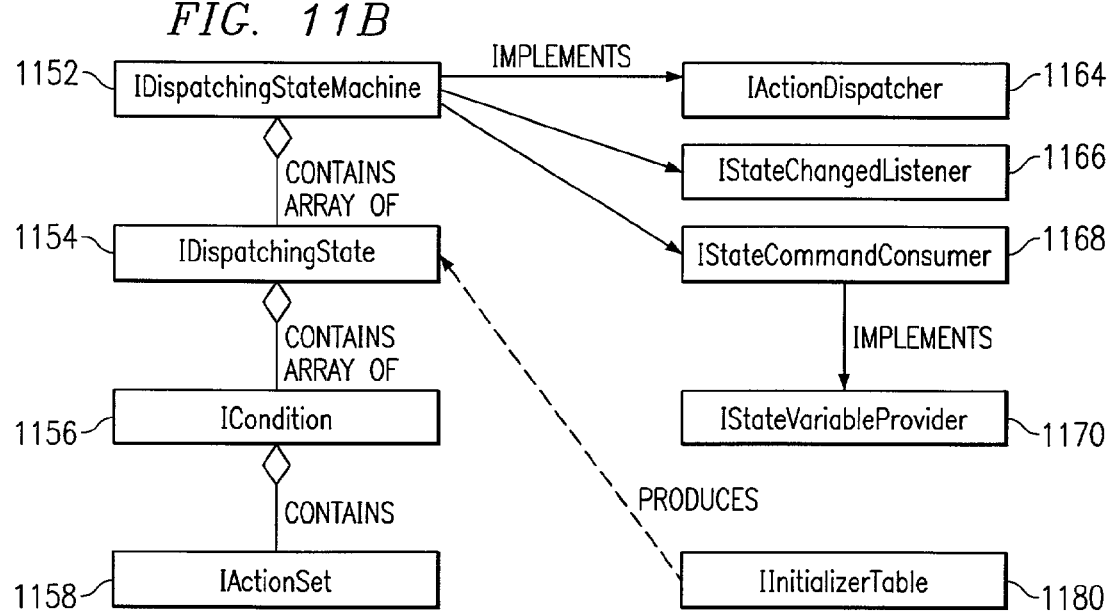

Turning now to FIGS. 11A and 11B, a set of interfaces for defining the programming framework is shown in accordance with a preferred embodiment of the present invention. An interface is a Java class that defines the structure of another Java class. For example, an interface defines the methods that a class may have.

In particular, FIG. 11A depicts a set of interfaces for a state machine initializer class. Any object implementing the IInitializerTable interface 1102 must contain an array of IInitializerRow interfaces 1104 and an array of IInitializerVariable interfaces 1106. The IInitializerTable interface corresponds to the FSM Initializer 1120 of FIG. 10. The IInitializerTable interface defines the structure for a state machine initializer object class. The IInitializerRow interface defines the structure for a row in an initializer object. The array of IInitializerRow objects correspond to the output of the "createTableElementArray" method 1022. The IInitializerVariable interface defines the structure for a variable in an initializer object.

Each object implementing the IInitializerRow interface 1104 contains an array of IInitializerCondition interfaces 1108. The IInitializerCondition interface defines the structure for a condition. Each interface 1108 contains an array of IInitializerAllowedValues interfaces 1110 and an array of IActionSet interfaces 1112. Interface 1110 defines the allowed values for inputs and indexes the IInitializerVariable interface. Interface 1112 defines the structure for actions in a state machine initializer.

FIG. 11B depicts a set of interfaces for a state machine object class. IDispatchingStateMachine interface 1152 defines the structure of a state machine object class. Interface 1152 implements IActionDispatcher interface 1164, IStateChangedListener interface 1166, and IStateCommandConsumer interface 1168. Further, interface 1168 implements IStateVariableProvider interface 1170.

The IDispatchingStateMachine interface also contains an array of IDispatchingState interfaces 1154. Interface 1154 contains an array of ICondition interfaces 1156 and Each ICondition interface contains an IActionSet interface 1158. Also, IInitializerTable interface 1180 produces interface 1154.

When designing the logical operation of a state machine, the designer uses the user interfaces depicted in FIGS. 9A–9D to enter the design information. The tool providing the user interfaces stores the data in objects that obey the interface contract of the interfaces defined in FIG. 11A. The implementation of the objects holding the design data is provided by the tool supplier, but the interface meets the requirements and behaviors defined in this invention.

When designing the software implementation of a state machine, a second programmer uses standard Java software development tools to create a set of state machine objects that implement the runtime interfaces defined in FIG. 11B. The state machine consists of one or more objects, which in aggregate obey the interface relationships described in FIG. 11B.

As described in FIG. 10, an FSM object 1010 meeting the interfaces of FIG. 11B, in particular interface IDispatchingStateMachine 1152, will be created by a thread or application. The constructor of the FSM object 1010 will use the initializer object 1020 that meets the interfaces of FIG. 11A, in particular the IInitializerTable interface 1102. Because the objects involved meet the interfaces, the bridge between design time specification and runtime execution is crossed easily.

Furthermore, an FSM object that complies with the interfaces of FIG. 11B is capable of performing actions and outputting events and state values. This allows state machines to be seamlessly combined and embedded. For example, command FSM 600 may be executed as one FSM object that may output event E1 and state SV to other state machines.

As another example, task FSM 700 is executed as one FSM object that embeds another FSM object for the command FSM. Yet, as a further example, trace task FSM 800 is executed as an FSM that embeds one FSM object for command FSM 600 and has as a superclass another FSM object for task FSM 700, which also embeds an FSM object for the command FSM, for a total of four FSM objects.

Figure 12:
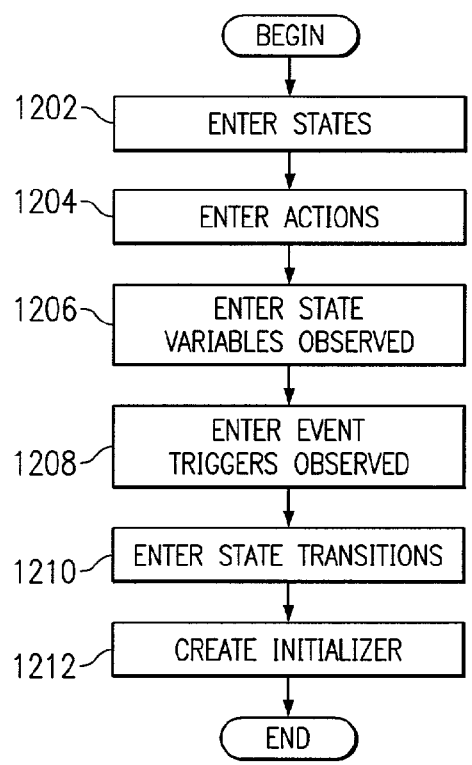
FIG. 12 is a flowchart illustrating the creation of a state machine initializer in accordance with a preferred embodiment of the present invention.

With reference to FIG. 12, a flowchart illustrating the creation of a state machine initializer is shown in accordance with a preferred embodiment of the present invention. The process begins, prompts a user to enter states (1202), and prompts the user to enter actions (step 1204). Then, the process prompts the user to enter state variables observed (step 1206), prompts the user to enter event triggers observed (step 1208), and prompts the user to enter state transition information (step 1210). Thereafter, the process creates the FSM initializer (step 1212) and ends. More sophisticated state machine design tools may allow iteration of this loop, or may allow the tasks to be completed in parallel.

Figure 13:
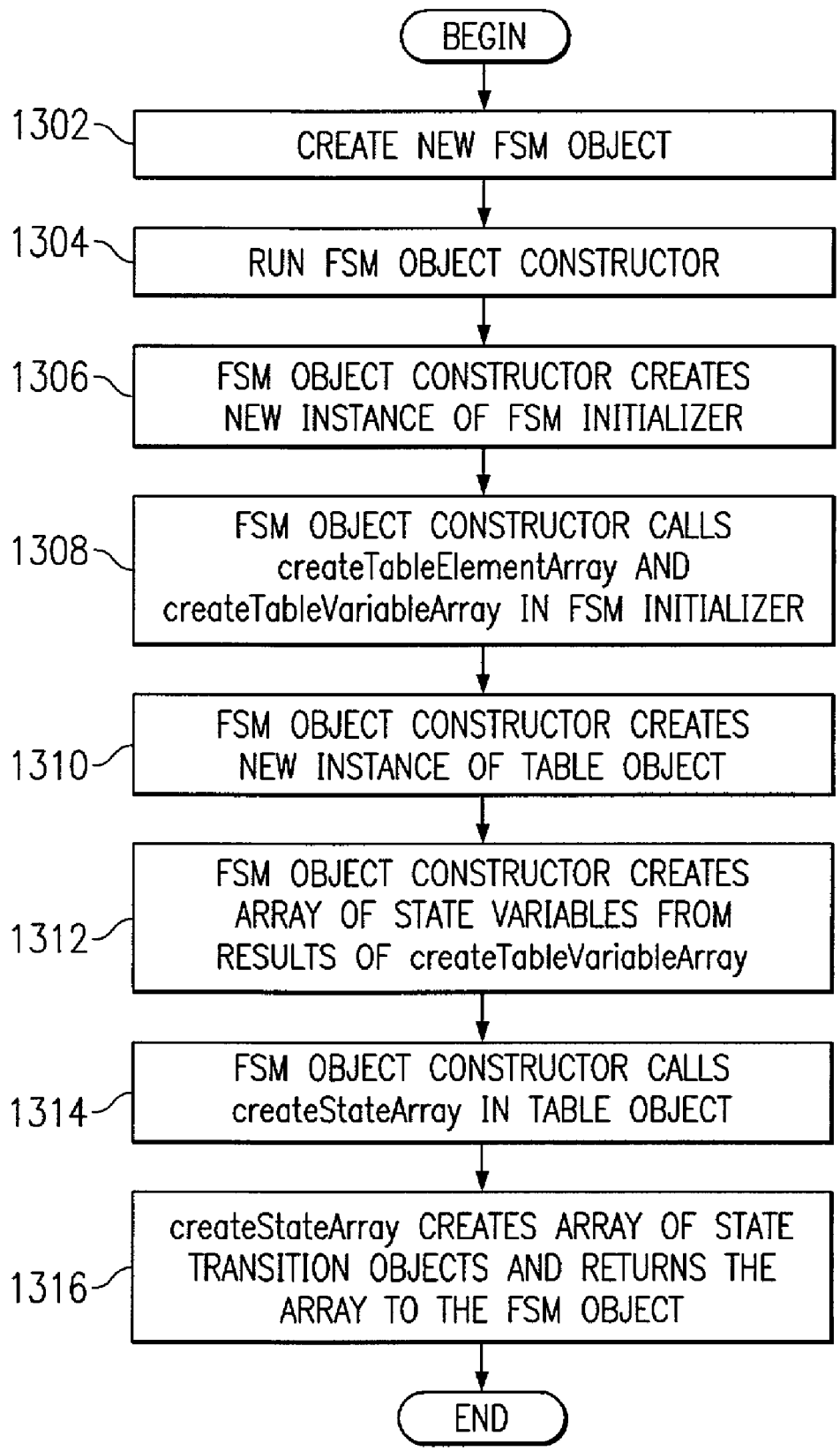
FIG. 13 is a flowchart illustrating the building of a state machine at runtime in accordance with a preferred embodiment of the present invention.

Turning now to FIG. 13, a flowchart illustrating the binding of a state machine at runtime to the design information from the initializer is depicted in accordance with a preferred embodiment of the present invention. The process begins and creates a new FSM object (step 1302). The process then runs the FSM object constructor (step 1304) and the FSM object constructor creates a new instance of the FSM initializer (step 1306) and calls the createTableElementArray method and the createTableVariableArray method in the FSM initializer (step 1308).

Next, the FSM object constructor creates a new instance of a table object (step 1310) and creates an array of state variables from the results of the createTableVariableArray method (step 1312). The FSM object constructor calls the createStateArray method in the table object (step 1314). The createStateArray method creates an array of state transition objects and returns the array to the FSM object (step 1316). Thereafter, the FSM is ready to run and the process ends.

Thus, the present invention solves the disadvantages of the prior art by providing a framework for creating state machine initializers and for creating software state machines at runtime. A state machine initializer may be created using a graphical user interface. All the information for creating a state machine is provided in the state machine initializer without having to code every condition, state transition, and action. Furthermore, a general FSM object may be used with different state machine initializers to run different state machines.

A set of interfaces is provided to define the framework. Thus, state machine initializers and state machine implementations may be easily used together. For example, since the FSM object implements an interface, the FSM object includes a method that returns the state of the state machine. Therefore, a programmer may create one FSM that uses the initializer produced by another FSM tool as a condition without knowing the details of the programming of the other FSM.

Events generated by one state machine may be used as triggers by another state machine. Furthermore, state values of one state machine may be used as inputs by another state machines. State machines may also share triggers and inputs. The programming interfaces allow state machines to be seamlessly combined and embedded without having to know the details of how the state machines are programmed.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. For example, although the depicted embodiment is directed towards a programming framework in a Java environment, the processes of the present invention may be applied to other programming languages and environments. The embodiment was chosen and described in order to best explain the principles of the invention, the practical application, and to enable others of ordinary skill in the art to understand the invention for various embodiments with various modifications as are suited to the particular use contemplated.

What is claimed is:

1. A data processing system implemented method for providing a software state machine that is responsive to at least one input and at least one trigger, wherein the software state machine provides at least one output event based upon a current state of the software state machine and the at least one input, comprising:

providing a first state machine object, wherein the first state machine object is configured to use a first initializer object to execute a first software state machine, wherein the first software state machine comprises (i) a state table that defines states that the first software state machine may take, (II) an actions table that defines actions that the first software state machine may take, (iii) an inputs table that defines inputs to the first software state machine that affect state transitions within the first software state machine, (iv) a triggers table that defines triggers that initiate operation of the first software state machine, (v) an events table that defines output events that may be generated by the first software state machine, (vi) a state transitions table that defines stats transitions of the first software state machine, conditions that cause the state transitions, end the output events that are generated when the state transitions complete, and (vii) a conditions table that defines logical conditions that are examined in conjunction with entries in the state transition table; and providing a second state machine object, wherein the second state machine object is configured to use a second initializer object to execute a second software state machine,
wherein the second state machine object is configured to interact with the first state machine abject based on the second initializer object.

2. The meted of claim 1, wherein the second state machine object is configured to embed the first state machine object.

3. The method of claim 1, wherein the second state machine object is a subclass of the first state machine object.

4. The method of claim 1, wherein the second state machine object shares a common input with the first state machine object, wherein the common input is used in determining a next state of each of the first software state machine and the second software state machine during execution of the first software state machine and the second software state machine.

5. The method of claim 1, wherein the second software state machine shares a common trigger with the first software state machine, the common trigger invoking an internal operation within both first software state machine and the second software state machine.

6. The method of claim 1, wherein the first software state machine generates at least a first event and outputs a state value, and wherein the second software state machine (i) receives she first event as a trigger that initiates operation of the second software state machine, and (ii) receives the state value as an input for use in determining a next state of the second software state machine.

7. The method of claim 6, wherein the first software state machine generates at least a first event, and wherein the second software state machine receives the first event as a trigger.

8. The method of claim 6, wherein the first software state machine generates at least a first event and outputs a state value, and wherein the second software state machine receives the state value as an input for use in determining a next state of the second software state machine.

9. The method of claim 6, wherein the first software state machine generates at least a first event and outputs a state value, and wherein the state value is accessible to a software object outside of the second state machine object.

10. The method of claim 1, further comprising:
providing a third state machine object, wherein the third state machine object is configured to use a third initializer object to execute a third software state machine,
wherein the third state machine object is configured to interact with the second state machine object based on the third initializer object.

11. The method of claim 10, wherein the third state machine object is a subclass of the second state machine object.

12. The method of claim 10, wherein the third state machine object is configured to embed both the first state machine object and the second state machine object.

13. An apparatus for providing a software state machine that is responsive to at least one input and at least one trigger, wherein the software state machine provides at least one output event based upon a current state of the software state machine and the at least one input, comprising:
a processor; and
a memory having stored therein a first state machine object, a first initializer object, a second state machine object, and a second initializer object,
wherein the first state machine object is configured to use the first initializer object to execute a first software stare machine, wherein the first software state machine comprises (i) a state table tat defines states that the first software state machine may take, (ii) an actions table that defines actions that the first software state machine may take, (iii) an, inputs table that defines inputs to the first software state machine that affect state transitions within the first software state machine, (iv) a triggers table that defines triggers that initiate operation of the first software state machine, (v) an events table that defines output events tat may be generated by the first software state machine, (vi) a state transitions table that defines state transitions of the first software state machine, conditions that cause the state transitions, and the output events that are generated when the state transitions complete, and (vii) a conditions table that defines logical conditions that are examined in conjunction with entries in the state transition table;
wherein the second state machine object is configured to use the second initializer object to execute a second software state machine; and
wherein the second state machine object is configured to interact with the first state machine object based on the second initializer object.

14. The apparatus of claim 13, wherein the second state machine object is configured to embed the first state machine abject.

15. The apparatus of claim 13, wherein the second state machine object is a subclass of the first state machine object.

16. The apparatus of claim 13, wherein the second state machine object shares a common input with the first state machine object, wherein the common input is used in determining a next state of each of the first software state machine and the second software state machine during execution of the first software state machine and the second software state machine.

17. The apparatus of claim 13, wherein the second software state machine shares a common trigger with the first software state machine, the common trigger being operable for invoking an internal operation within both first software state machine and the second software state machine.

18. The apparatus of claim 13, wherein the first software state machine generates at least a first event and outputs a state value, and wherein the second software state machine (i) receives the first event as a trigger that initiates operation of the second software state machine, and (ii) receives the state value as an input for use in determining a next state of the second software state machine.

19. The apparatus of claim 18, wherein the first software state machine generates at least a first event, and wherein the second software state machine receives the first event as a trigger.

20. The apparatus of claim 18, wherein the first software state machine generates at least a first event and outputs a state, value, and wherein the second software state machine receives the state value as an input for use in determining a next state of the second software, state machine.

21. The apparatus of claim 18, wherein the first software state machine generates at least a first event and outputs a state value, and wherein the state value is accessible to a software object outside of the second state machine object.

* * * * *